United States Patent [19]
Le Flem

[11] Patent Number: 5,866,959
[45] Date of Patent: Feb. 2, 1999

[54] COOLING ARRANGEMENTS FOR ROTATING ELECTRICAL MACHINES

[75] Inventor: Graham Le Flem, Warwickshire, United Kingdom

[73] Assignee: GEC Alsthom Limited, United Kingdom

[21] Appl. No.: 905,492

[22] Filed: Aug. 4, 1997

Related U.S. Application Data

[63] Continuation of Ser. No. 443,248, May 17, 1995, abandoned.

[30] Foreign Application Priority Data

May 24, 1994 [GB] United Kingdom ................... 9410351

[51] Int. Cl.$^6$ ....................................................... H02K 5/24
[52] U.S. Cl. ............................ 310/51; 310/261; 310/211; 310/187; 310/52
[58] Field of Search .................................. 310/51, 54, 55, 310/52, 53, 261, 58, 59, 60 A, 61, 65, 64, 211, 187

[56] References Cited

U.S. PATENT DOCUMENTS

| | | | |
|---|---|---|---|
| 1,996,460 | 4/1935 | Coates | 310/51 |
| 4,208,597 | 6/1980 | Mulach et al. | 310/59 |
| 4,217,511 | 8/1980 | King et al. | 310/55 |
| 4,311,932 | 1/1982 | Olson | 310/61 |
| 4,323,802 | 4/1982 | Leistner | 310/59 |
| 4,994,700 | 2/1991 | Bansal et al. | 310/215 |
| 5,084,641 | 1/1992 | Saima et al. | 310/51 |
| 5,155,404 | 10/1992 | Sadarangani | 310/211 |
| 5,182,483 | 1/1993 | Hibino et al. | 310/211 |

FOREIGN PATENT DOCUMENTS

| | | | |
|---|---|---|---|
| C-295 610 | 12/1916 | Denmark . | |
| 0 155 405 A1 | 12/1984 | European Pat. Off. . | |
| 929566 | 6/1955 | France . | |
| 2240557 | 7/1974 | France | 2/20 |
| 2 240 557 | 3/1975 | France . | |
| 3106 | 2/1912 | Germany . | |
| 252335 | 4/1926 | Germany . | |
| 58-215954 | 3/1984 | Japan . | |
| 3106 | 8/1912 | United Kingdom . | |
| 252 335 | 9/1926 | United Kingdom . | |
| 358 240 | 10/1931 | United Kingdom . | |
| 938 180 | 10/1963 | United Kingdom . | |
| 938180 | 10/1963 | United Kingdom . | |
| 1 076 839 | 7/1967 | United Kingdom . | |
| 1354247 | 5/1972 | United Kingdom | 1/20 |
| 1 354 247 | 5/1974 | United Kingdom . | |

OTHER PUBLICATIONS

AEF, MITT vol. 54, No. 1/2 1964, "The state of development of squirrel–cage induction motors for high power ratings" by Egon C. Andresen.

The State of Development of Squirrel–Cage Induction Motors for High Power Ratings, Egon Christian Andresen, AEG. MITT vol. 54 Nos. 1/2, 1964, pp. 2–16.

The Bulb–Type Generators of Rock Island Power Station and Their Novel Cooling System, G. L. Ruelle, 8047 IEEE Transactions of Power Apparatus and Systems, 101 (1982) Jan.–May, Nos. 1–5, New York, USA, pp. 639–643.

Primary Examiner—Clayton E. LaBalle
Assistant Examiner—Timothy A Williams
Attorney, Agent, or Firm—Kirschstein, et al.

[57] ABSTRACT

A rotating electrical machine has openings (105) in its stator teeth (101) occupying a substantial part of the surface area of each tooth so that the stator windings (103) have only a short thermal path to axial cooling ducts created by the openings. In another embodiment, each rotor tooth (109) is provided with a recess (110) at one corner of the tooth to form a recess axial cooling duct; the recess may be of such a depth as to expose part of an adjacent slot (118) to the recess duct. Cooling is by air, either in a single-ended or a double-ended axial ventilation system.

16 Claims, 8 Drawing Sheets

COOLING ARRANGEMENTS FOR ROTATING ELECTRICAL MACHINES

This is a continuation application under 37 CFR 1.62, of pending prior application Ser. No. 08/443,248 filed on May 17, 1995, now abandoned.

BACKGROUND OF THE INVENTION

The invention concerns axial-flow cooling arrangements in rotating electrical machines, and in particular, though not exclusively, axial-flow cooling arrangements in a large cage induction machine employing exclusively air cooling of the stator and rotor.

Many large rotating machines employ what is known as radial ventilation for cooling the stator and rotor. An example of this is shown in FIG. 1. In FIG. 1, a squirrel cage induction motor 10 comprises a stator core 11 and a rotor core 12, each having a number of sections 13 and 14, respectively. Both cores are made up of a large number of laminations. The stator core 11 is firmly attached to a housing 15 and the rotor core 12 is secured to a shaft 16 which may drive a load (not shown). The stator core 11 is provided with a 3-phase winding 17, while the rotor core 12 is equipped with solid aluminium or copper rotor bars 18. The rotor bars 18 are shorted together in end rings, one at each end of the rotor. The stator core 11 and rotor core 12 are provided with radial ducts 19 through which air is forced in order to cool the stator and rotor.

Air inside the machine 10 is made to circulate round the machine by a fan 20 secured to the shaft 16. The air is drawn in through a number of ducts 21 situated between the rotor core and the shaft 16, and at the same time through an airgap 22 between the stator and rotor, the air then passing through the ducts 19 and over the rear 23 of the stator core, before being returned to the fan 20. On the way from the fan 20 to the air inlet points of the stator and rotor, the air passes through a heat exchanger 24, cooling air being supplied from outside the machine by a further fan 25 also mounted to the shaft 16.

The laminations of both the stator core and rotor core appear as shown in a simplified representation in FIG. 2. The stator laminations comprise a body portion 31 and a number of teeth 32. (In practice, the number of teeth in a large rotating machine would be much greater than the number shown in the figure). Between the teeth 32 are slots 33 into which the 3-phase winding 17 (see FIG. 1) is inserted.

The laminations of the rotor are constructed in a manner similar to those of the stator, i.e. each lamination consists of a body portion 35 and a number of teeth 36 and slots 37. The slots 37 are suitable shaped to receive the solid bars 18.

While radial ventilation has been used to good effect in large machines, it presents a number of drawbacks. Firstly, the use of a radial construction makes it difficult to achieve low vibration levels. This is because of the necessity to have, on the one hand, a special rotor arm construction for securing the rotor to the shaft while at the same time creating the duct spaces 21 for cooling the rotor, and, on the other hand, duct spacers (which may be in the form of "I" beams) separating the individual rotor core sections to create the radial ducts 19. Both these elements may create out-of-balance forces in the rotor assembly during operation, leading to vibration problems. Secondly, since there are radial ducts 19 in both the stator and the rotor, a "siren" noise effect can be produced when the machine is running, especially if the two sets of ducts are in line with each other. This can be reduced by offsetting the ducts on the stator relative to those on the rotor, or by employing a different number of ducts on the stator and the rotor. However, this causes complexity of manufacture and adds to the cost of the machine. Thirdly, the necessity for ventilation ducts 21 between the rotor core 36 and shaft 16 means that the rotor diameter is increased, which in turn increases the windage loss of the machine. Fourthly, there is an increased risk of airgap sparking. Fifthly, the forces exerted on the above-mentioned duct spacers (e.g. "I" beams) in a high-speed machine can cause these members to be dislodged from the end laminations to which they are supposed to be secured.

Because of these drawbacks, a technique known as axial ventilation has also been used. One known axial ventilation arrangement is shown in FIG. 3. In this arrangement, a ventilation duct 40 is provided in each of the teeth of the stator 11 adjacent to the airgap 22. The duct 40 runs the entire axial length of the stator, and air is forced through this duct in order to cool the laminations of the stator core and the windings 17. Additional cooling may be provided by forcing air through small ducts 41, 42 made in the body of the stator core and rotor core, respectively.

This technique enjoys the advantages of axial cooling, which include reduced windage due to the fact that the rotor 12 can be of smaller diameter, but suffers from the disadvantages manifest by the use of the duct 40, as will now be explained with the aid of FIG. 4.

FIG. 4 is a partial view of the arrangement of FIG. 3 showing a stator tooth 32 and two associated stator slots 33. Each slot 33 comprises a winding section 51 and a ventilation duct section 52, which represents the duct 40 in FIG. 3. The ventilation duct section 52 is sometimes termed a "tunnel slot". The winding section 51 accommodates the stator winding 53, which in this example is composed of two sections 54, each made from a number of rectangular conductors held together by a suitable binding means. The two sections 54 are kept apart by a separator 55. The winding 53 is prevented from moving down the slot 33 by a wedge 56 which runs the length of the stator core 11, or core section 12.

The use of such "tunnel slots" in such an axial ventilation system makes for inefficient cooling. This is for several reasons: firstly, the cross-sectional area of the tunnel slot 52 is relatively small, which restricts the flow rate of the cooling air and produces an undesirably large pressure drop along the axis of the stator. The tunnel slot 52 may be increased in depth to allow a greater throughput of air, but with this must go a reduction in depth of the winding section 51 in order not to prejudice too much the mechanical properties of the stator core. This in turn means that the winding 53 must be made shorter and fatter, which necessitates a longer end-winding 17 in order to satisfy minimum clearance requirements at the end-winding itself. Secondly, the surface area of the tunnel slot 52 in contact with the air is restricted, which impairs the cooling efficiency of the arrangement. Thirdly, the top part 57 of the winding 53 and its adjacent lamination portions have long heat flow paths 58 to the tunnel slot 52, which produces an undesirably high temperature gradient between these two parts of the slot.

FIG. 4 also shows a pair of rotor bars 18 occupying the slots 37 of the rotor 12.

Axial airflow has also been employed in a very large synchronous machine as an adjunct to the water cooling of the stator winding. This arrangement is shown in FIG. 5. In FIG. 5, which shows a stator tooth 32 and two adjacent slots 33, the stator tooth 32 is provided with two small ducts 61, 62 running the whole length of the stator core. These ducts serve to provide nominal axial air cooling of the stator laminations only. Cooling of the stator winding (not shown) in the slots 33 is achieved by arranging for the conductors of the winding to be hollow and forcing water through them.

In a further known axial cooling arrangement, a cage rotor 12 (see FIG. 6) is provided with small-diameter air ducts 71 in the rotor teeth 37. In order to supplement the inadequate cooling effect that this measure produces, the arrangement incorporates in addition larger ducts 72 situated in the body of the rotor core below each rotor bar 18. Thus the ducts 71 perform essentially cooling of the laminations with some cooling of the rotor bars 18, while ducts 72 take away heat mainly from the rotor bars 18.

It is an object of the invention to provide a rotating electrical machine with axial cooling of the stator and/or rotor which seeks to overcome or mitigate the drawbacks associated with the above known axial cooling arrangements.

SUMMARY OF THE INVENTION

According to a first aspect of the invention, there is provided a rotor core for a cage induction machine, comprising a plurality of teeth and a plurality of rotor-bar slots, each tooth being provided with a recess in an outer corner of the tooth, the recess forming a ventilation duct which extends along the axial length of the rotor core.

This has the advantage of increasing local airgap turbulence and improving the transfer of heat from both the stator windings and rotor bars to the circulating air. In addition, the mass of the rotor, and therefore also its inertia, is reduced, and also saturation of the leakage reactances of the stator and rotor can be eliminated. Further, the use of such a recess helps to reduce high-frequency losses in the rotor bars.

Preferably, the recess is of such a radial depth as to expose part of an adjacent slot to the duct. This has the effect of directly exposing part of a rotor bar occupying that slot to the cooling air, thereby greatly increasing efficiency of cooling of the bars.

Preferably, the rotor teeth are configured so that an unrecessed corner of any one tooth completely bounds the top (short) edge of its associated rotor bar. This means that, even with the presence of a recess in an adjacent tooth, as described above, that recess does not result in the absence of any lamination from the top edge of the bar. This has the benefit that it provides full mechanical support of the bar and therefore reduces crushing stresses, especially at high speed. A further benefit is that this unrecessed part of the tooth acts as a heat sink when the rotor is stalled. This is significant because when the rotor is locked, rotor slip frequency is at a maximum and most of the current flowing in a rotor bar is crowded toward the top end of the bar. Having laminations all the way along that short top edge helps to dissipate a substantial part of the heat which is thereby produced.

According to a second aspect of the invention, there is provided a stator core for a rotating electrical machine, comprising a plurality of teeth, each tooth having one or more openings extending along an axial length of the core to form one or more corresponding axial ventilation ducts, the one or more openings of each tooth being dimensioned such that they provide a total radial opening depth which extends over a major part of the radial depth of the tooth.

The inventors have recognised that, on 2-pole machines especially, the flux densities in the stator teeth are relatively low, which means that the teeth are under-utilised. It has been found that, by providing the teeth with fairly large openings, ducts may be thereby formed for the influx of air for cooling the windings, while at the same time leaving the magnetic performance of the core relatively unaffected.

The rise in flux density in the teeth occasioned by this measure can be somewhat offset for a given opening area by narrowing the slots and thereby increasing the flux-carrying width of the teeth. Narrowing the slots also makes for narrower windings in the slots. This means that the stator end windings can be made shorter, and therefore the machine can be made smaller. This in turn has the advantage of reducing the length of the shaft carrying the rotor, and thus the bearing centres can be brought closer and the stiffness of the shaft increased.

The chief benefit that arises from having an opening area in the tooth that occupies a major part of the tooth depth (which is the same as the slot depth) is that virtually the whole radial depth of the winding (or rotor bar, in the case of a cage rotor) in a slot has only a short path to the cooling duct formed in an adjacent tooth, which makes for efficient cooling. This is in contrast to the "tunnel slot" arrangement of FIG. 4, for instance, where the upper part of the winding has a long path to the ventilating tunnel slot.

A number of configurations are possible for the one or more openings. A preferred configuration is to have two rectangular or trapezoidal holes disposed end-to-end along the radial axis of the tooth and separated by a bridge section, the holes being situated approximately midway along the width of the tooth. Alternatively, two such pairs of holes may be employed side by side along the width of the tooth and suitably spaced from each other and from the adjacent slots.

Instead of having holes punched in the stator laminations, each lamination making up the stator core may be provided with one or more recesses along one edge of the tooth, i.e. where the tooth borders onto an adjacent slot. Such recesses may be configured in a manner similar to the above holes. Thus, a preferred arrangement is to have two rectangular or trapezoidal recesses disposed end-to-end along one radial edge of the tooth and separated by a bridge section. Alternatively, two such pairs of recesses may be employed along opposite edges of the tooth.

A further possible opening configuration is to have one opening or recess only running along most of the radial depth of the tooth. As before, the single opening may be a hole situated approximately midway along the width of the tooth, or a recess disposed along one radial edge of the tooth. This latter arrangement is not a preferred configuration, however, since it makes for difficulties in preventing migration of the adjacent winding into the recess. The use of a bridge section in the double (end-to-end) recess configuration has the advantage of controlling such migration.

A further possible configuration is to use two such single openings side by side. Again, the preferred arrangement in this case is to have two long holes suitably spaced along the width of the tooth. The use of two long recesses along opposite edges of the tooth would suffer from the same winding migration problem as the use of a single recess along only one edge.

An opening area created by the one or more openings may extend beyond the radial depth of the tooth. This has the effect of increasing the available duct volume per tooth and is a possible measure, especially in the stator, where the flux density in the core will not thereby be made excessive or where mechanical stiffness considerations of the stator core will not be a prohibiting factor. This latter proviso is mitigated somewhat by the presence of part of the tooth around the opening, which tends to increase the stiffness of the stator core.

According to a third aspect of the invention, there is provided a rotor assembly comprising a rotor core as described above, and according to a fourth aspect of the invention, there is provided a stator assembly comprising a stator core as described above. The stator or rotor core may comprise one or more radial ventilation ducts for use in a double-ended axial ventilation arrangement. This is useful where the invention is required to be used in a very large machine with a correspondingly large cooling requirement.

According to a fifth aspect of the invention, there is provided a rotating electrical machine comprising a rotor assembly as defined above, and according to a sixth aspect of the invention there is provided a rotating electrical machine comprising a stator assembly as defined above. A seventh aspect of the invention is a rotating electrical machine comprising both stator and rotor assemblies as described earlier, the inventors having found that particularly good results are obtained using both the axial ventilation ducts as described for the stator and the axial tooth recesses as described for the rotor.

BRIEF DESCRIPTION OF THE DRAWINGS

The invention will now be described, by way of example only, with reference to the drawings, of which.

DETAILED DESCRIPTION OF THE INVENTION

Figure 7:
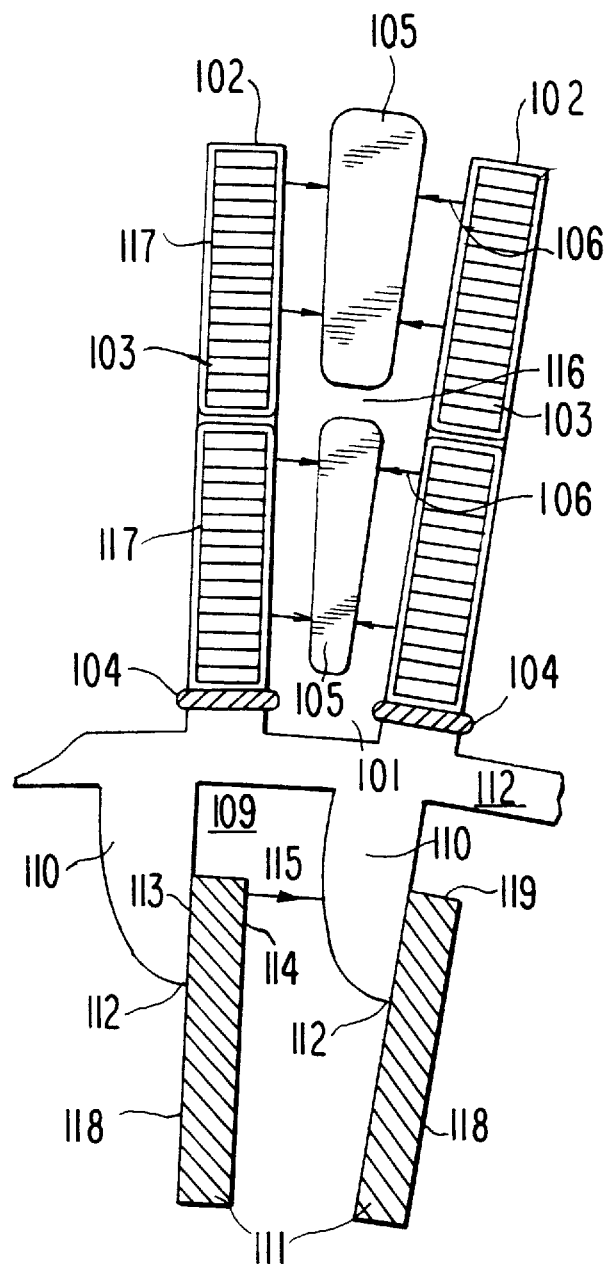
FIG. 7 is a partial end view of a first embodiment of a stator assembly and a rotor assembly according to the invention.

Referring to FIG. 7, FIG. 7 shows a partial view of a stator and rotor core assembly in a preferred embodiment of the invention. The two cores are part of a 2-pole cage induction motor and, since cooling is by axial, not radial, ventilation, the cores consist of only one core section. Each core comprises a large number of laminations placed together in a stack. The diagram shows a stator tooth 101 bounded by two stator slots 102, and a winding 103, which is divided into two layers 117, is shown inserted into the slots 102 in the stator core. The windings are held in place by wedges 104. In the tooth portion 101 of each lamination of the stator core are stamped two openings in the form of holes 105 with a bridge piece 116 left between them, such that there is formed along the axial length of the stator core two ventilation ducts per tooth allowing the flow of air through the tooth portion of the core. The bridge piece 116 helps to maintain adequate rigidity of the tooth 101. The upper opening 105 is arranged to extend beyond the radial depth of the slots 102 into the body of the stator, and the total end-to-end radial depth of the two openings is greater than one-half of the depth of the slots 102.

In operation of the machine, a fan (not shown) blows air through the ducts made by the holes 105 and carries heat away from the winding 103 via very short thermal paths 106 in each lamination. These paths run in parallel all the way along the axis of the stator, there being a total cooling surface area per tooth equal to the sum of the measurements of the perimeters of the two openings 105 in the tooth multiplied by the axial length of the stator. This has the effect of cooling very efficiently not only the tooth laminations, but also the windings 103. The cooling air is circulated around the machine and dissipates its heat to a heat exchanger (see FIG. 1).

At the same time, the laminations which make up the rotor core are arranged to have their own openings 110 in the rotor teeth 109. The openings 110 are recesses which create, in a manner similar to the holes 105 in the stator laminations, ventilation ducts along the axial length of the rotor core. As in a conventional cage rotor, bars 111 are mounted in the rotor slots 118 and shorted to each other at either end of the rotor core. By arranging for the recesses 110 to start at some point 112 along the radial length of the respective rotor bars 111, a significant proportion of one face 113 of each bar is exposed to air and is thereby directly cooled by the contacting air. Also, the other face 114 of each rotor bar 111 is separated from the next recess in the series by only a comparatively short thermal path 115, which also assists in cooling the bar. This provides efficient removal of heat from the bars and rotor laminations.

In addition to this, when the machine is running, the recess 110 in each of the rotor laminations increases the local turbulence in the airgap 112, which improves the transfer of heat away from the rotor laminations and bars 111.

A further effect of the recesses 110 is that they reduce the mass and therefore inertia of the rotor.

The presence of laminations against the top side 119 of the rotor bars helps greatly in the event that the rotor stalls. A locked rotor has its rotor-bar current concentrated in the upper part of each bar, which abuts onto the corner of an adjacent tooth in which there is no recess. Under these conditions, the unrecessed corner of the tooth acts as a heat sink and helps to dissipate the heat away from the bar.

Figure 1:
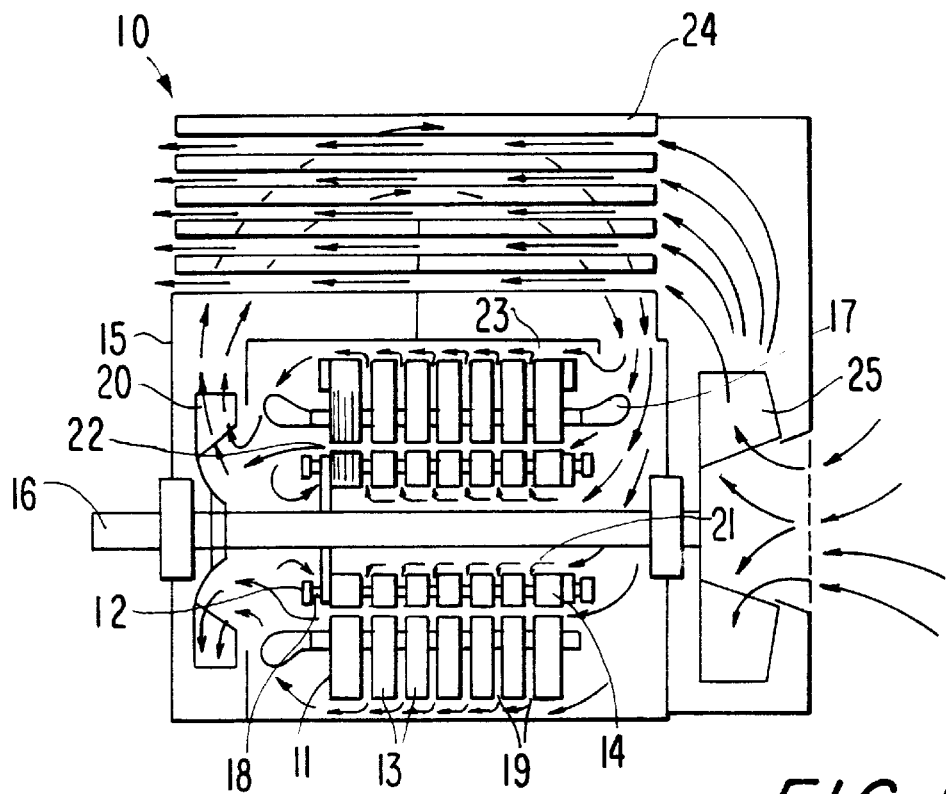
FIG. 1 is a simplified side section of a typical large cage induction machine employing radial cooling.
Figure 2:
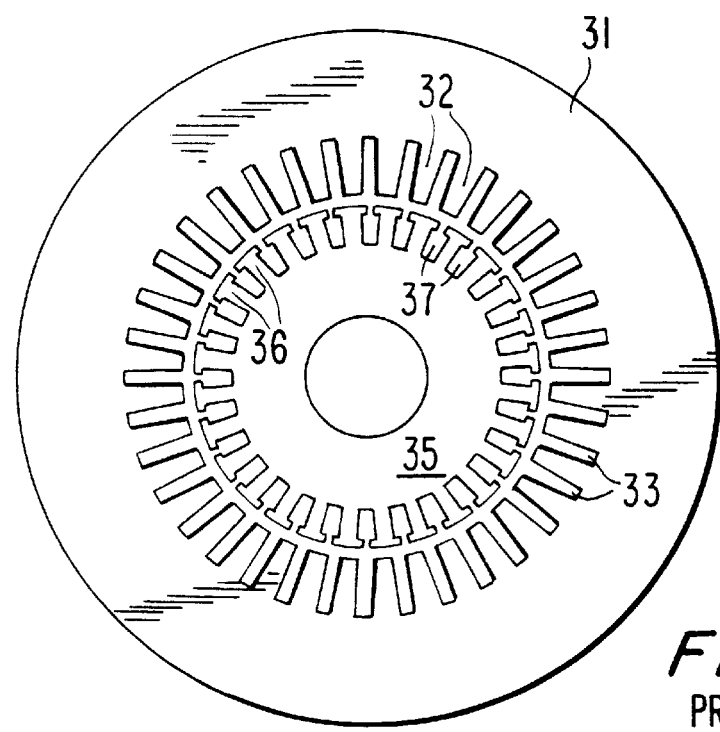
FIG. 2 is a simplified view of a typical stator and rotor lamination.
Figure 3:
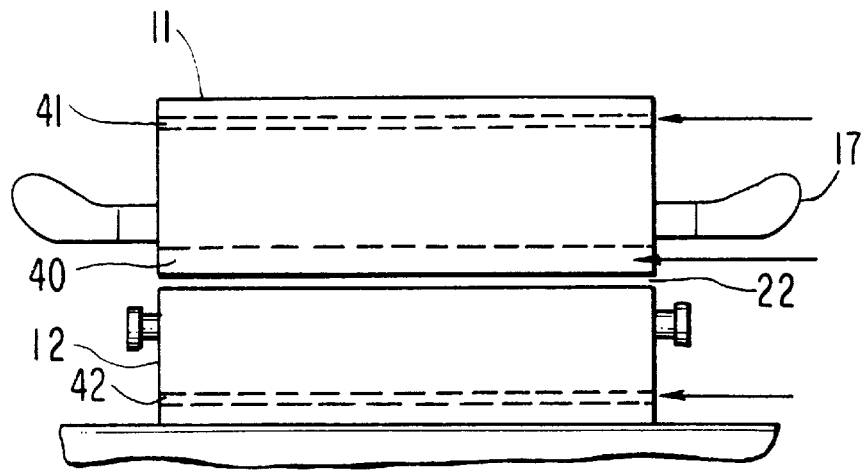
FIG. 3 is a side section of a known stator and rotor assembly arrangement incorporating axial ventilation.
Figure 5:
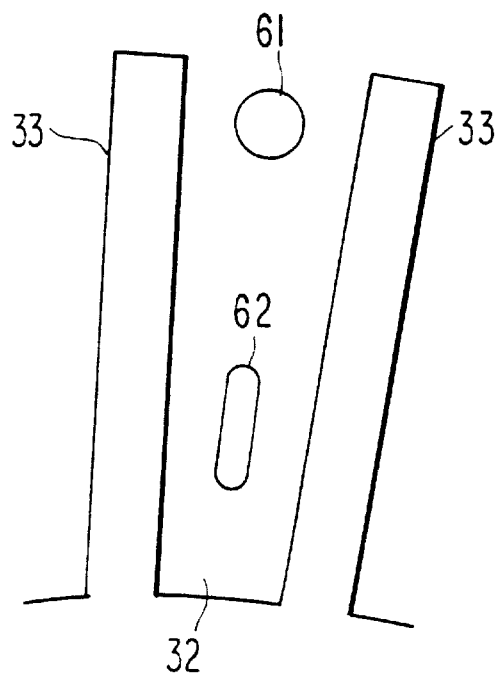
FIG. 5 is a partial view of a stator lamination in a second known axial cooling arrangement.
Figure 4:
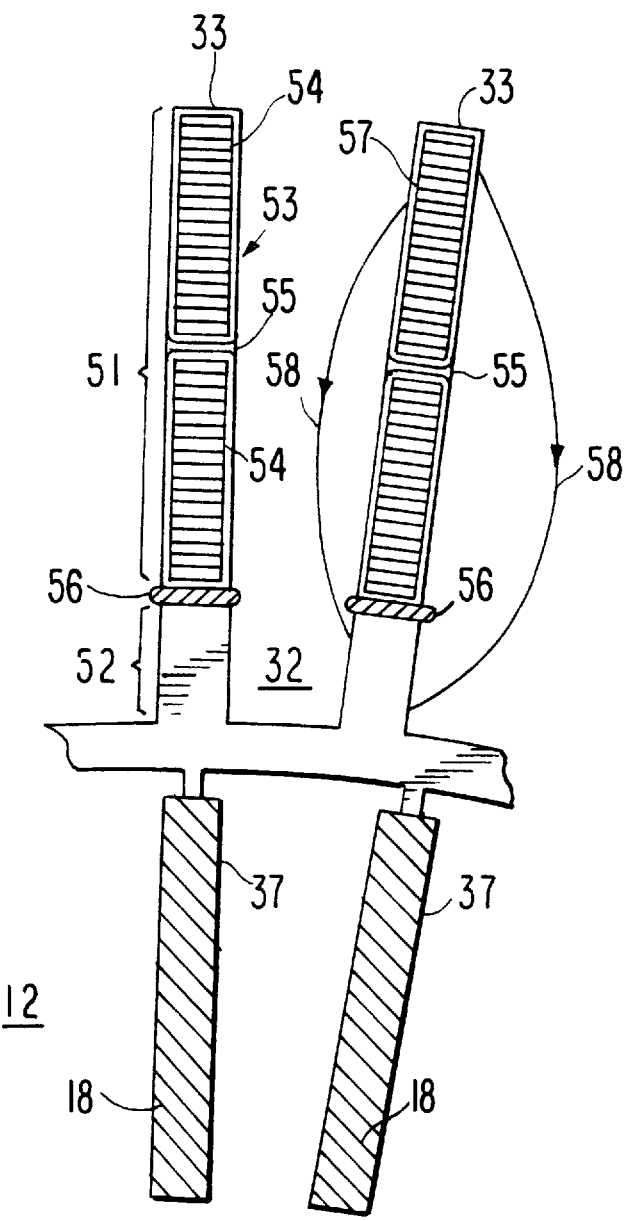
FIG. 4 is a partial end view of the arrangement of FIG. 3 showing the use of "tunnel slots" for cooling the stator.
Figure 6:
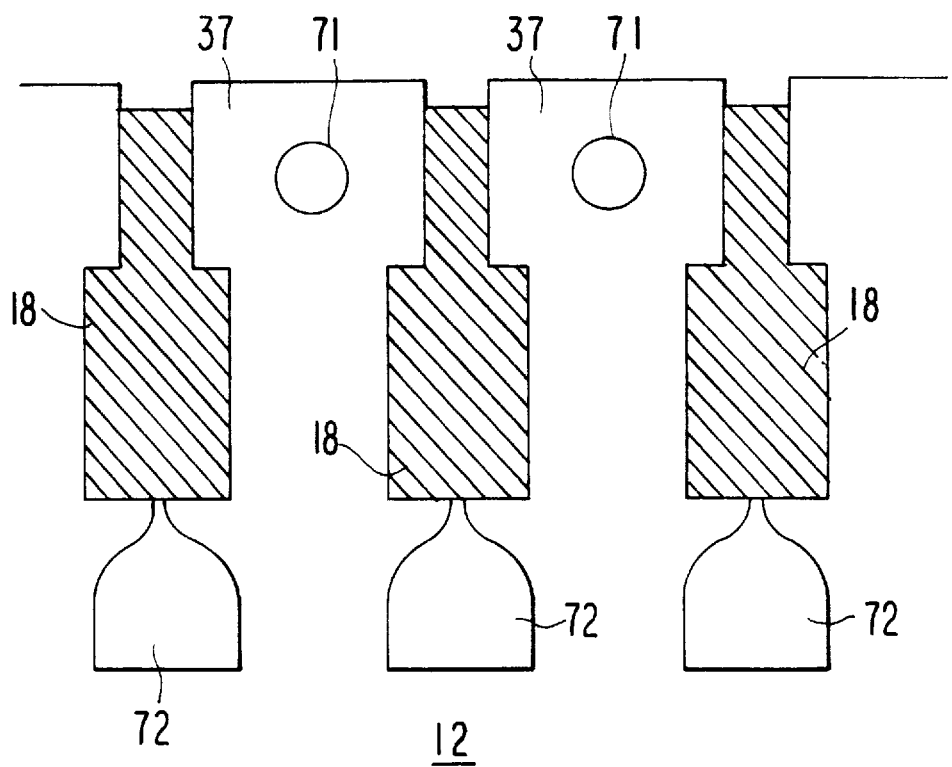
FIG. 6 is a partial view of a rotor assembly in a third known axial cooling arrangement.

While it may be doubted that the total cooling surface area in the stator assembly, for instance, of FIG. 7 would be of the same order as that in the radially ventilated stator assembly of FIG. 1, in fact calculations made by the inventors on the sum of the surface area of the stator ducts formed by the openings 105 of a prototype design of the invention proved that the available cooling area was almost equal to the apparently much greater surface area afforded by the massive end lamination faces of each stator section 13 exposed to the radial ducts 19 in the known radial-ventilation arrangement (see FIG. 1).

An examination of thermal coefficients in the two systems also highlights the advantages of the invention. From FIG. 1 it can be seen that the conduction of heat from laminations in the middle of a stator core section 13 (which may be taken to be the hottest part of the stator) must take place across a large number of insulated laminations, which in practice are approximately 25 mm deep in total (half the depth of a core section). The thermal conductivity of the laminations is approximately 2.2 W/mK. In the arrangement according to the invention, however, the hottest part of the stator is the winding 103, and the distance from the winding to the nearest airflow is, in the embodiment of FIG. 7, about 6 or 7 mm, which applies to all the laminations in the core. In addition, since the heat in the arrangement according to the invention flows through the plane of the laminations (i.e. solely through metal) and not through the thickness of the laminations (i.e. through metal plus insulation) the thermal conductivity of the metal used for the laminations must be used in calculations, not that of the metal and insulation in series. Thermal conductivity for the pure metal is approximately 30 W/mK. This means that there is, in the invention, a total gain in cooling efficiency of $25/7 \times 30/2.2 \cong 55$ when comparing the hottest parts of the two arrangements.

Figure 8:
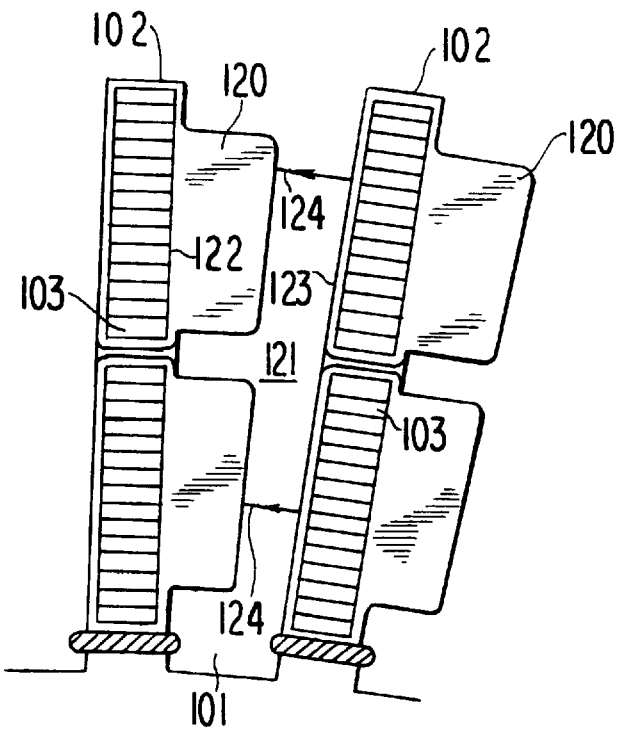
FIG. 8 is a partial end view of a second embodiment of a stator assembly according to the invention.

A second embodiment of a stator assembly according to the invention is shown in FIG. 8. In this embodiment, the stator laminations have stamped in them two openings 120 in the tooth 101. These openings, which are recesses, differ from the holes 105 in the first embodiment of the stator assembly in that they are arranged to be a continuation of the slot 102, thereby leaving a substantially narrowed radially extending tooth portion 121. This configuration functions in a manner similar to the rotor recesses in FIG. 7: one face 122 of the windings 103 is directly cooled by air flowing through the ducts formed by the recesses 120, while the other face 123 has a short thermal path 124 to the recesses of the next tooth.

Figure 9A:
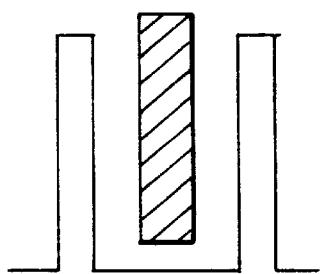
FIGS. 9a, b, c, d, e, and f are of partial views of a stator lamination showing various alternative configurations of opening according to the invention.
Figure 9B:
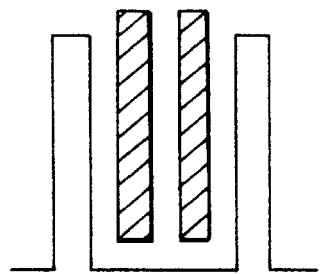
Figure 9C:
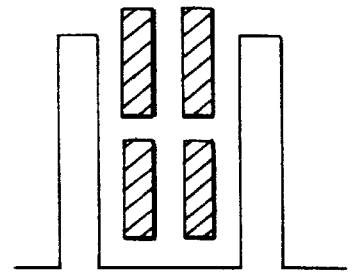
Figure 9D:
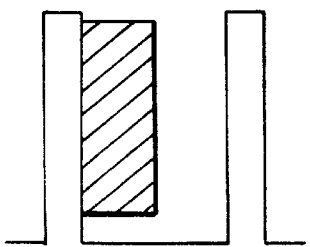
Figure 9E:
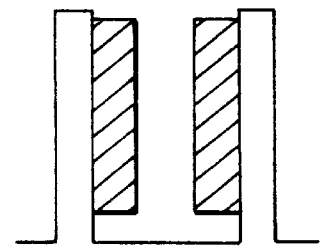
Figure 9F:
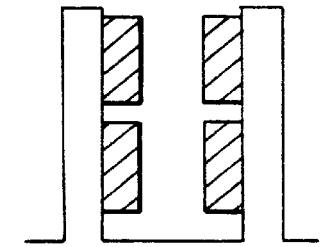

The openings in the stator may be configured in other ways. Examples of other configurations are shown in FIG. 9. FIGS. 9a, b and c show alternative forms of openings in the form of holes, while FIGS. 9d, e and f show the equivalent in the form of recesses. The holes/recesses are, in each case, shown hatched. Briefly, a single long opening only may be used, though in the case of the single recess shown in FIG. 9d, e and f this may entail difficulties with regard to the anchoring of the winding in the adjacent slot. Alternatively, two long but narrower openings may be used side by side; this has the same disadvantage as the single-opening arrangement. Finally, four openings may be employed in the form of two pairs of the openings shown in the first embodiment of the stator assembly, FIG. 7. These alternative configurations function in exactly the same way as the preferred configurations illustrated in FIGS. 7 and 8 and will therefore not be discussed further.

Figure 10:
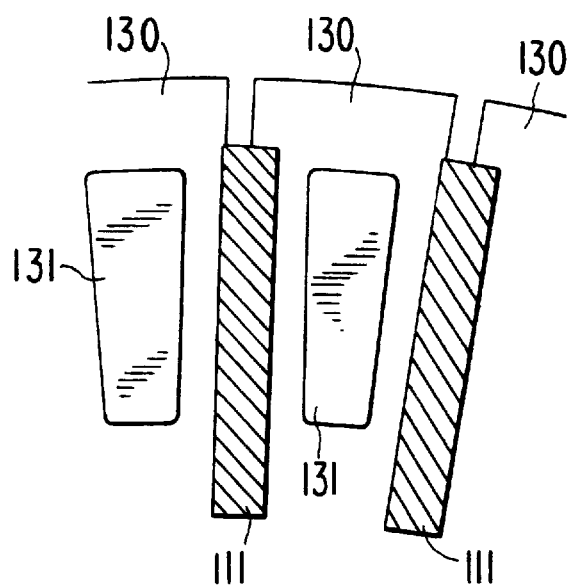
FIG. 10 is a partial end view of a second embodiment of a rotor assembly according to the invention.

It is possible to employ the openings, which have hitherto been described in connection with the stator, for the rotor also. This is illustrated in FIG. 10, in which the rotor teeth 130 are provided with holes 131 situated between the rotor bars 111, in a manner similar to the stator holes 105 in the first embodiment (FIG. 7). This second embodiment still provides effective air cooling, but lacks the specific advantages outlined earlier associated with the open recess shown in FIG. 7 (i.e. increase in local airgap turbulence, elimination of leakage reactance saturation, etc.).

Figure 11:
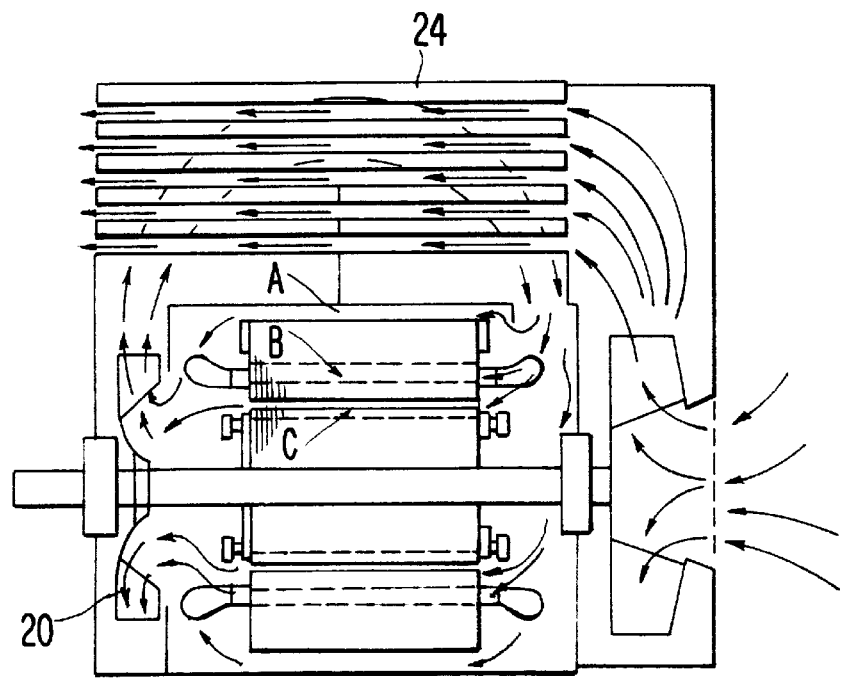
FIG. 11 is a simplified side section of a rotating machine according to the invention showing an axial cooling arrangement.

FIG. 11 shows a simplified sectional view of a rotating machine according to the invention highlighting the airflow which takes place inside the machine. Air enters the machine compartment from the right, having been forced through a heat exchanger 24 by a fan 20. The air then follows three parallel paths, A, B and C: A is a path behind the body of the stator core; B is a path through the openings in the stator teeth, and C is a path through the recesses in the rotor teeth and through the airgap.

The fact that the air paths are all in parallel is one of the great advantages of axial ventilation, since if it is found that too much heat is being generated in the stator teeth, for instance, but little heat is being generated to the rear of the stator core, airflow along path A can be restricted and that along path B can be increased, and so on.

While it has so far been assumed that a machine according to the invention will employ both the stator as described with its openings and the rotor as described with its recesses, in practice it may employ only one of these. In particular, because the rotor-cooling arrangement of FIG. 7, for instance, entails so many benefits for the performance of a machine into which it is incorporated, it may be used by itself in conjunction with a conventionally cooled stator in an existing machine, the stator having, for example, water-cooled windings.

Figure 12:
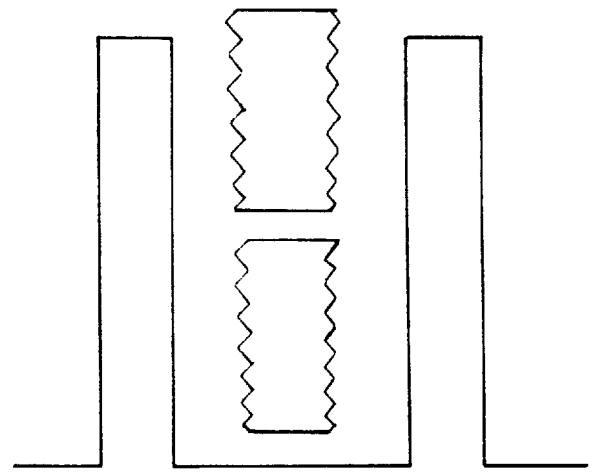
FIG. 12 shows an opening configuration designed to increase the available surface area of a cooling duct.

Also, in order to increase the cooling surface area of the ducts created by the openings, it is possible to provide the openings with corrugated edges, as shown in FIG. 12. The corrugations may be on the longer edges or on all the edges of an opening, depending on ease of manufacture.

Where the invention is to be used on a very large machine, it is possible to employ a combination of axial and radial ventilation to obtain sufficient cooling. In this arrangement, which is known as double-ended axial ventilation, one or more radial ducts are placed in the centre of the stator and/or rotor which allows air to flow into both ends of the machine at the same time. This has the advantage of reducing the pressure drops and equalising the temperature variations which occur along the axis of the machine.

Figure 13:
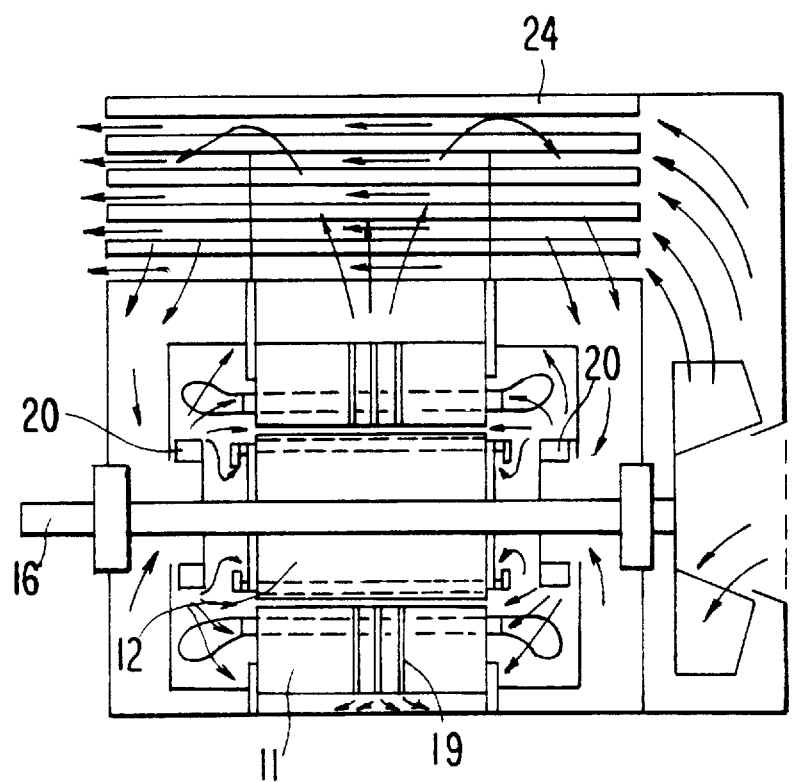
FIG. 13 is a simplified side section of a rotating machine according to the invention showing a double-ended axial cooling arrangement.

An example of double-ended axial ventilation is shown in FIG. 13. In this figure, the stator 11 is equipped with three radial ducts 19, the rotor 12 with none. A fan 20 is placed at either end of the machine on the shaft 16, and these fans draw air into both ends of the machine simultaneously along the same three paths illustrated in FIG. 11. Air flowing along the stator tooth ducts and the rotor tooth ducts (where this is a recess) and airgap is then forced through the radial ducts 19 when it reaches the central part of the machine and is taken up through the heat exchanger 24 before recirculating through the machine.

It should be mentioned that the inventors have built a 3.7 MW, 60 Hz, 2-pole cage induction motor using the principles embodied in FIG. 7, and performance in all aspects met or exceeded expectations. In particular, cooling was found to be very satisfactory, vibration was minimal and noise was at a very low level, due partly, for example, to the reduced windage loss. Actual figures obtained for the various parameters were: efficiency, 97.5%; vibration, <1 mm/sec.; noise, 78 dBA.

I claim:

1. A rotating electrical cage-induction machine, comprising:

a) a rotor having a rotor core, said core having an outer peripheral boundary, a plurality of rotor-bar slots and a plurality of teeth, and a plurality of rotor bars disposed in respective said rotor-bar slots, said bars each having a radial edge disposed in an approximately radial direction, a recess being provided in each tooth in an outer corner thereof thereby to form a ventilation duct in said tooth extending along an axial length of the rotor core, said duct communicating with said radial edge and intersecting said outer peripheral boundary; and b) a stator having a plurality of teeth, each tooth having one or more openings extending along an axial length of the core to form one or more corresponding axial air-cooling ducts, the one or more openings of each tooth being dimensioned such that they provide a total radial opening depth which extends over a major part of a radial depth of the tooth.

2. The cage-induction machine as claimed in claim 1, in which a first pair of said openings is disposed along the radial depth of the tooth.

3. The cage-induction machine as claimed in claim 2, in which said openings are holes disposed substantially centrally along the width of the tooth.

4. The cage-induction machine as claimed in claim 2, in which said openings are recesses disposed along one radial edge of the tooth.

5. The cage-induction machine as claimed in claim 2; and further comprising a further pair of openings disposed along the radial depth of the tooth alongside said first pair.

6. The cage-induction machine as claimed in claim 5, in which said openings are holes.

7. The cage-induction machine as claimed in claim 5, in which said openings are recesses, said pairs of recesses being situated along opposite radial edges of the tooth.

8. The cage-induction machine as claimed in claim 1; and further comprising two openings disposed side by side along the width of the tooth, each opening being of a radial depth which extends over a major part of the depth of the tooth.

9. The cage-induction machine as claimed in claim 8, in which said openings are holes.

10. The cage-induction machine as claimed in claim 8, in which said openings are recesses situated along opposite radial edges of the tooth.

11. The cage-induction machine as claimed in claim 1, in which an opening area created by said one or more openings extends beyond the radial depth of the tooth.

12. The rotor as claimed in claim 1, and further comprising one or more radial ducts in the rotor core for use in a double-ended axial air-cooling arrangement.

13. The cage-induction machine as claimed in claim 1; and further comprising one or more radial ducts for use in a double-ended axial ventilation arrangement.

14. A rotor for a cage induction machine, said rotor comprising:

a rotor core, said core having an outer peripheral boundary, a plurality of rotor-bar slots and a plurality of teeth; and a plurality of rotor bars disposed in respective said rotor-bar slots, said bars each having a radial edge extensive in an approximately radial direction, a recess being provided in each tooth in an outer corner thereof thereby to form a ventilation duct in said tooth extending along an axial length of the rotor core, said duct communicating with said radial edge and intersecting said outer peripheral boundary.

15. The rotor as claimed in claim 14, in which said bars each has a radially outermost edge, at least a major part of said radially outermost edge being in contact with an adjacent tooth.

16. The rotor as claimed in claim 14, in which said recess is unconstricted at a periphery of said rotor.

* * * * *